US012094629B1

(12) United States Patent
Langlois et al.

(10) Patent No.: US 12,094,629 B1
(45) Date of Patent: Sep. 17, 2024

(54) SELF-INSULATING METAL VIAS IN MAGNETIC MICRO-DEVICES

(71) Applicant: National Technology & Engineering Solutions of Sandia, LLC, Albuquerque, NM (US)

(72) Inventors: Eric Langlois, Albuquerque, NM (US); Michael J. K. Abere, Albuquerque, NM (US); Dale L. Huber, Albuquerque, NM (US); Jamin Ryan Pillars, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 700 days.

(21) Appl. No.: 17/376,496

(22) Filed: Jul. 15, 2021

Related U.S. Application Data

(60) Provisional application No. 63/067,536, filed on Aug. 19, 2020.

(51) Int. Cl.
*H01F 1/24* (2006.01)
*H01F 1/00* (2006.01)
*H01F 27/255* (2006.01)
*H01F 41/30* (2006.01)

(52) U.S. Cl.
CPC ........... *H01F 1/0072* (2013.01); *H01F 41/30* (2013.01); *H01F 1/24* (2013.01); *H01F 27/255* (2013.01); *Y10T 428/32* (2015.01)

(58) Field of Classification Search
None
See application file for complete search history.

(56) References Cited

U.S. PATENT DOCUMENTS 7,298,238 B1 * 11/2007 Eaton .................. H01F 27/2804 336/200
8,461,775 B2 * 6/2013 Choutov .............. H05B 45/375 336/200

(Continued)

OTHER PUBLICATIONS

Gu, Y. et al., "Direct-Write Printed, Solid-Core Solenoid Inductors with Commercially Relevant Inductances," Advanced Materials Technologies (2018) 1800312, 7 pages.

*Primary Examiner* — Kevin M Bernatz
(74) *Attorney, Agent, or Firm* — Mark A. Dodd

(57) ABSTRACT

A magnetic micro-device and process to manufacture the same is disclosed. The magnetic micro-device has a near-zero conductivity magnetic nanocomposite film layer with a plurality of apertures through which a corresponding plurality of electrical conductors (vias) pass. Due to the near-zero conductivity of the magnetic nanocomposite film layer, the vias are self-insulating. The presence of the magnetic nanocomposite film layer results in greater inductance than that possible with an air core (or core-less) magnetic micro-device. Potential magnetic micro-devices include toroid micro-inductors, solenoid micro-inductors, toroid micro-transformers, and solenoid micro-transformers. Additional potential magnetic micro-devices include generators, motors, electromagnetic switches, and voice coils (for speakers or microphones). The process used to manufacture the magnetic micro-device can be scaled to cost-effectively produce large numbers of the magnetic micro-device.

17 Claims, 7 Drawing Sheets

(56) References Cited

U.S. PATENT DOCUMENTS

| | | | | |
|---|---|---|---|---|
| 8,610,533 | B2 * | 12/2013 | Nussbaum | H02M 3/1584 336/221 |
| 8,786,393 | B1 * | 7/2014 | Chen | H01F 27/2804 336/200 |
| 8,907,447 | B2 * | 12/2014 | Wang | H01L 28/10 438/381 |
| 10,497,511 | B2 * | 12/2019 | Sherrer | C25D 5/022 |
| 10,553,342 | B2 * | 2/2020 | Lazarus | H01F 27/24 |
| 11,404,197 | B2 * | 8/2022 | Kubik | H01F 27/263 |
| 2005/0156704 | A1 * | 7/2005 | Gardner | H01F 10/265 336/232 |
| 2009/0146638 | A1 * | 6/2009 | Sugahara | H02M 3/33569 323/355 |
| 2010/0109123 | A1 * | 5/2010 | Strzalkowski | H01F 17/0013 336/200 |
| 2010/0188183 | A1 * | 7/2010 | Shpiro | H01F 41/041 156/185 |
| 2014/0053004 | A1 * | 2/2014 | Chang | H02M 3/158 713/300 |
| 2015/0187488 | A1 * | 7/2015 | Williams | H05K 3/061 29/606 |
| 2016/0013547 | A1 * | 1/2016 | Tishin | H01Q 1/40 343/873 |
| 2017/0213635 | A1 * | 7/2017 | Bertels | H01F 41/041 |
| 2018/0097055 | A1 * | 4/2018 | Pizzi | H01L 23/645 |
| 2019/0004202 | A1 * | 1/2019 | Yu | G01V 3/081 |
| 2020/0335275 | A1 * | 10/2020 | Allen | B32B 3/00 |

* cited by examiner

SELF-INSULATING METAL VIAS IN MAGNETIC MICRO-DEVICES

RELATED APPLICATIONS

This application claims priority to U.S. Provisional Application No. 63/067,536, filed on Aug. 19, 2020, and entitled SELF-INSULATING METAL VIAS IN MAGNETIC MICRO-DEVICES, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to magnetic micro-devices, such as inductors and transformers, having self-insulating metal vias, and a method for making the same.

BACKGROUND

For many electronic applications, there is a need to reduce the size, weight, and power required to implement a particular function. Many of those functions require magnetic devices, such as inductors or transformers. A number of groups have worked at miniaturizing inductors in an effort to reduce at least their size and weight.

One issue frequently encountered by these miniaturized inductors has been their very low inductances, typically in the nH range. Such inductors may therefore perform satisfactorily for applications operating in the GHz range. Unfortunately, these inductors cannot be used for lower frequency applications, for example, voltage regulator circuits, where inductances in the μH to mH range may be required.

Gu et al. describes one effort to direct write inductors using additive manufacturing (AM). See, Y. Gu et al., "Direct-Write Printed, Solid-Core Solenoid Inductors with Commercially Relevant Inductances," Advanced Material Technologies, doc. no. 1800312 (2018), the contents of which are incorporated herein by reference. While Gu et al., demonstrated devices having inductances greater than 1 uH, they required a mix of direct written traces and pick and place insertion of high magnetic permeability cores. For this reason, these devices do not readily lend themselves to mass production.

In spite of these previous efforts, the need still exists for miniaturized magnetic devices having appreciable inductances that are amenable to mass production.

SUMMARY

One aspect of the present invention relates to a magnetic micro-device having a near-zero conductivity magnetic nanocomposite film layer with a plurality of apertures through which electrical conductors (vias) pass. Due to the near-zero conductivity of the magnetic nanocomposite film layer, the vias are self-insulating. The presence of the magnetic nanocomposite film layer results in greater inductance than that possible with an air core (or core-less) magnetic micro-device. In various embodiments, the magnetic micro-device may be a toroid micro-inductor, a solenoid micro-inductor, a toroid micro-transformer, or a solenoid micro-transformer. The process used to fabricate the magnetic micro-device can be scaled to cost-effectively produce large numbers of the magnetic micro-device.

In at least one primary embodiment of the present invention, a magnetic micro-device comprises a bottom wire layer, a magnetic nanocomposite film layer on a top surface of the bottom wire layer (the magnetic nanocomposite film layer having near-zero conductivity, the magnetic nanocomposite film layer including a plurality of apertures therethrough), a plurality of vias within the plurality of apertures, and a top wire layer on a top surface of the magnetic nanocomposite film layer and a top surface of the plurality of vias (the plurality of vias electrically interconnecting the bottom wire layer and the top wire layer), wherein the bottom wire layer, the plurality of vias, and the top wire layer in combination form at least one continuous coil.

In various secondary embodiments of the present invention, the bottom wire layer includes a plurality of bottom blades and the top wire layer includes a plurality of top blades; each of the bottom wire layer, the plurality of vias, and the top wire layer comprises one or more of gold, silver, copper, and aluminum; each of the bottom wire layer and the top wire layer has a thickness of between approximately 0.5 μm and approximately 1.0 mm; near-zero conductivity means a conductivity of less than approximately 1.0 nS/m; the magnetic nanocomposite film layer comprises one or more of Fe, Co, Ni, FeN, CoFe, CoNiFe, oxide-coated ferromagnetic nanoparticles, or nitride-coated ferromagnetic nanoparticles; the magnetic nanocomposite film layer has a thickness of between approximately 1.0 μm and approximately 1.0 mm; a permeability of the magnetic nanocomposite film layer varies as a function of position; further comprises a first encapsulating magnetic nanocomposite film layer on a bottom surface of the bottom wire layer and a bottom surface of the magnetic nanocomposite film layer and a second encapsulating magnetic nanocomposite film layer on a top surface of the top wire layer and the top surface of the magnetic nanocomposite film layer; and the magnetic micro-device is one of a toroid micro-inductor, a solenoid micro-inductor, a toroid micro-transformer, or a solenoid micro-transformer.

In at least one primary embodiment of the present invention, a micro-transformer comprises a first bottom wire layer, a second bottom wire layer, a magnetic nanocomposite film layer on the first bottom wire layer and the second bottom wire layer (the magnetic nanocomposite film layer having near-zero conductivity, the magnetic nanocomposite film layer including a plurality of apertures therethrough), a first plurality of vias within a first portion of the plurality of apertures, a second plurality of vias within a second portion of the plurality of apertures, a first top wire layer on the magnetic nanocomposite film layer and the first plurality of vias (the first plurality of vias adapted to electrically interconnect the first bottom wire layer and the first top wire layer), and a second top wire layer on the magnetic nanocomposite film layer and the second plurality of vias (the second plurality of vias adapted to electrically interconnect the second bottom wire layer and the second top wire layer), the first bottom wire layer, the first plurality of vias, and the first top wire layer in combination form a first continuous coil, and the second bottom wire layer, the second plurality of vias, and the second top wire layer in combination form a second continuous coil.

In various secondary embodiments of the present invention, the first bottom wire layer includes a first plurality of bottom blades, the first top wire layer includes a first plurality of top blades, the second bottom wire layer includes a second plurality of bottom blades, and the second top wire layer includes a second plurality of top blades; the first plurality of bottom blades is interdigitated with the second plurality of bottom blades, and the first plurality of top blades is interdigitated with the second plurality of top blades; near-zero conductivity means a conductivity of less than approximately 1.0 nS/m; the magnetic nanocomposite film layer comprises one or more of Fe, Co, Ni, FeN, CoFe, CoNiFe, oxide-coated ferromagnetic nanoparticles, or nitride-coated ferromagnetic nanoparticles; the first continuous coil and the second continuous coil have a turns ratio of 1:N, when N<1, the micro-transformer implements a voltage step-down function, when N=1, the micro-transformer implements an isolation function, and when N>1, the micro-transformer implements a voltage step-up function; and the micro-transformer is a toroid micro-transformer or a solenoid micro-transformer.

In at least one primary embodiment of the present invention, a micro-transformer comprises a first bottom wire layer, a bottom magnetic nanocomposite film layer on the first bottom wire layer (the bottom magnetic nanocomposite film layer having near-zero conductivity, the bottom magnetic nanocomposite film layer including a plurality of bottom apertures therethrough), a first bottom plurality of vias within the plurality of bottom apertures, a second lower wire layer on the bottom magnetic nanocomposite film layer and the first bottom plurality of vias, a middle magnetic nanocomposite film layer on the bottom magnetic nanocomposite film layer (the first bottom plurality of vias, and the second lower wire layer, the middle magnetic nanocomposite film layer having near-zero conductivity, the middle magnetic nanocomposite film layer including a plurality of middle apertures therethrough), a first middle plurality of vias within a first portion of the plurality of middle apertures, a second middle plurality of vias within a second portion of the plurality of middle apertures, a second upper wire layer on the middle magnetic nanocomposite film layer and the second middle plurality of vias, a top magnetic nanocomposite film layer on the middle magnetic nanocomposite film layer, the first middle plurality of vias, and the second upper wire layer (the top magnetic nanocomposite film layer having near-zero conductivity, the top magnetic nanocomposite film layer including a plurality of top apertures therethrough), a first top plurality of vias within the plurality of top apertures, and a first top wire layer on the top magnetic nanocomposite film layer and the first top plurality of vias, the first bottom wire layer, the first bottom plurality of vias, the first middle plurality of vias, the first top plurality of vias, and the first top wire layer are electrically interconnected and in combination form a first continuous coil, and the second lower wire layer, the second middle plurality of vias, and the second upper wire layer are electrically interconnected and in combination form a second continuous coil.

In various secondary embodiments of the present invention, near-zero conductivity means a conductivity of less than approximately 1.0 nS/m; and at least a portion of the first continuous coil encircles at least a portion of the second continuous coil.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Fundamental Device

Figure 1:
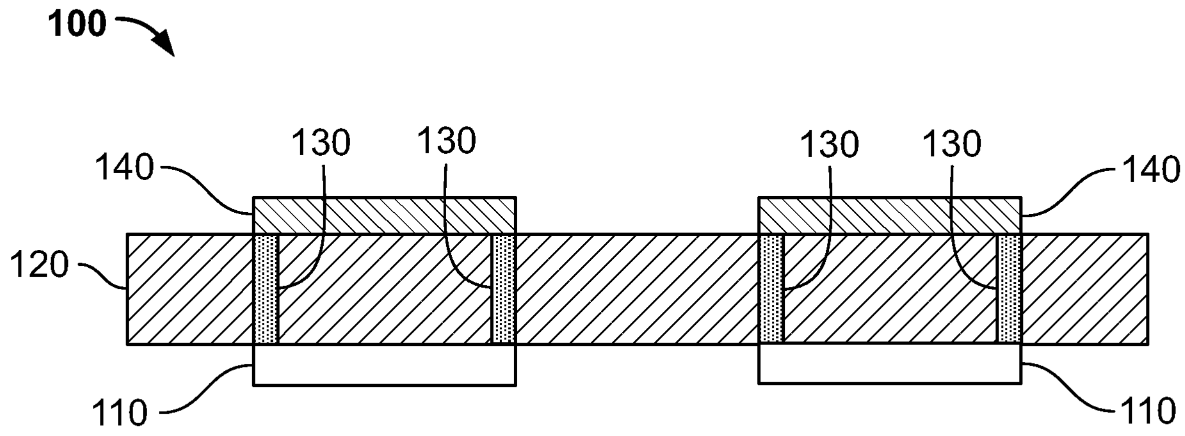
FIG. 1 illustrates a cross-sectional view of a toroid micro-inductor in accordance with one or more embodiments of the present invention.
Figure 2:
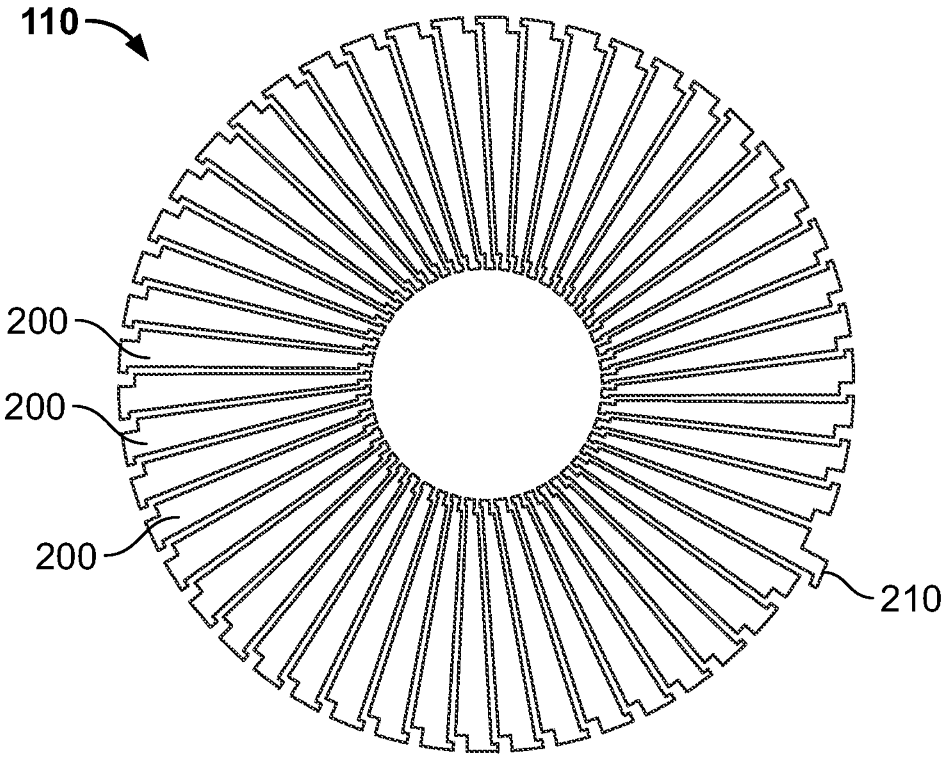
FIGS. 2-4 illustrate plan views of various layers of a toroid micro-inductor in accordance with one or more embodiments of the present invention.
Figure 3:
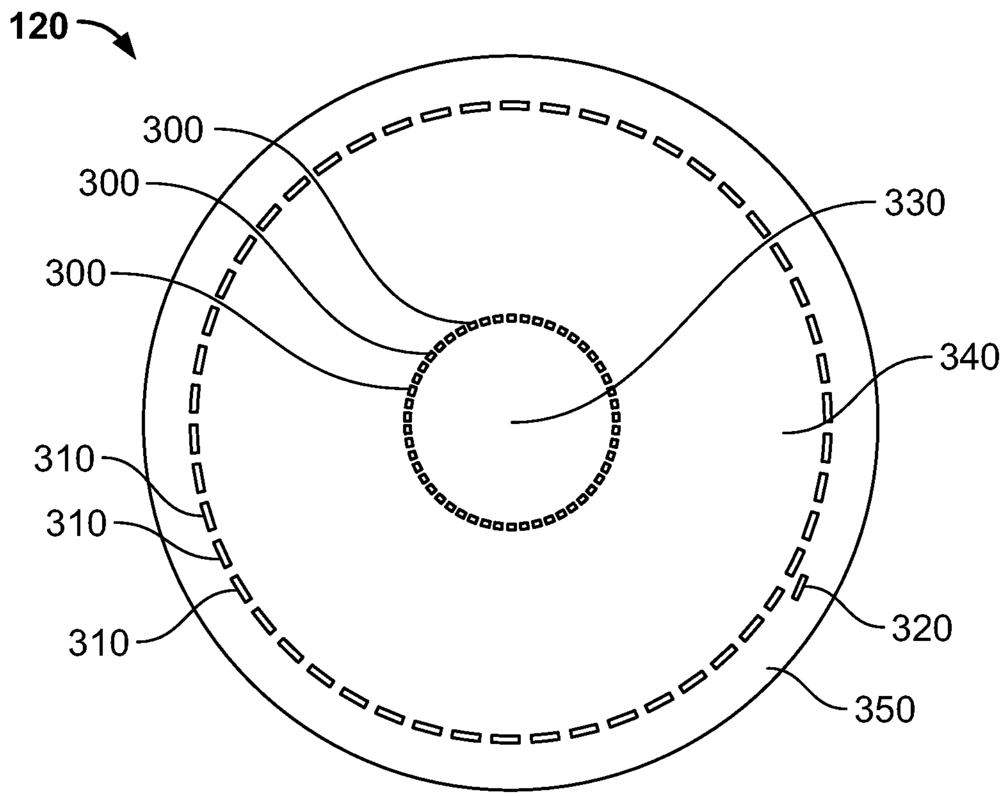
Figure 4:
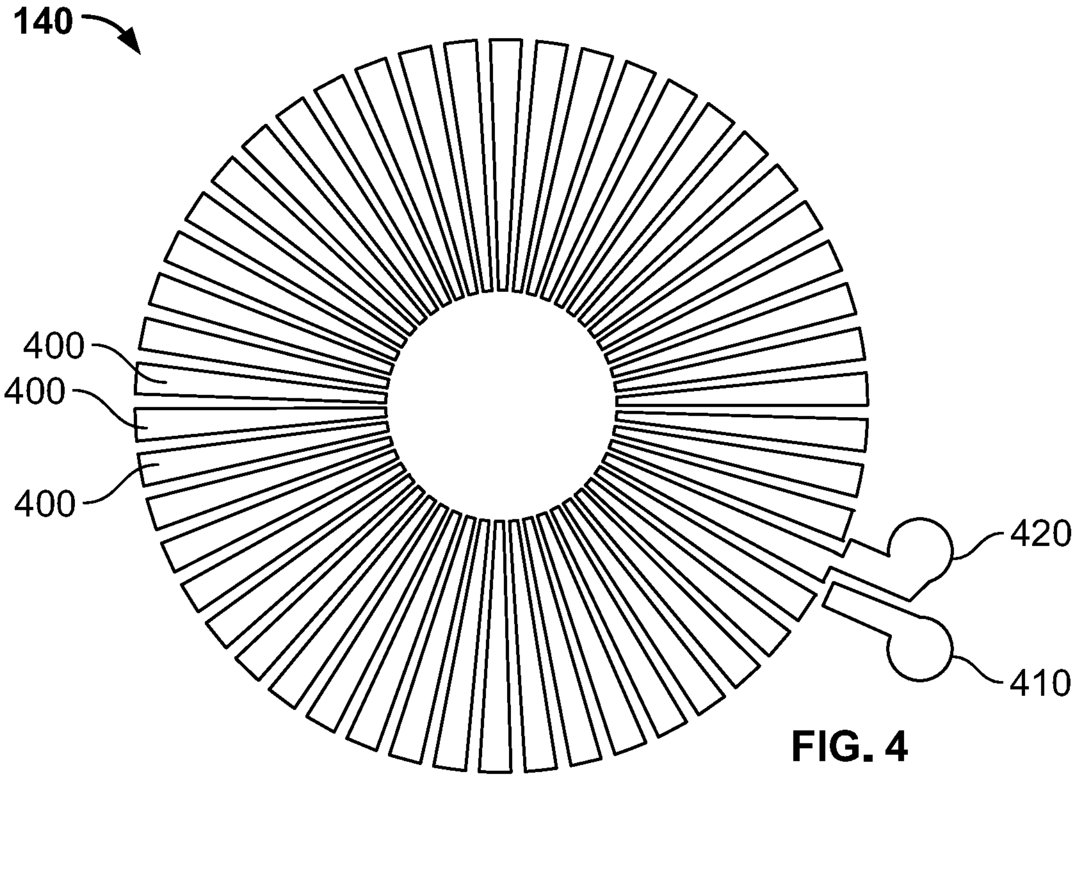

FIG. 1 illustrates a cross-sectional view of a toroid micro-inductor 100 in accordance with one or more embodiments. The micro-inductor 100 includes a bottom wire layer 110, magnetic nanocomposite film layer 120, a plurality of vias 130, and a top wire layer 140. The micro-inductor 100 is a toroid inductor, as will be appreciated by those of ordinary skill in the art upon viewing FIGS. 2-4, which illustrate plan views of the bottom wire layer 110, the magnetic nanocomposite film layer 120 and the plurality of vias 130, and the top wire layer 140, respectively. As illustrated in FIG. 2, the bottom wire layer 110 is composed of a series of generally radial blades 200, in conjunction with an input lead tab 210. The input lead tab 210 is electrically connected to a corresponding input lead 410, which is part of the top wire layer 140 in this illustrated embodiment. As illustrated in FIG. 4, the top wire layer 140, similar to the bottom wire layer 110, is composed of a series of generally radial blades 400, but further includes the input lead 410, and an output lead 420. The input lead 410 and the output lead 420 are preferably electrically interconnected with two adjacent ones of the generally radial blades 400. As illustrated in FIG. 3, the magnetic nanocomposite film layer 120 is generally continuous, with the plurality of vias 130 composed of inner vias 300 and outer vias 310. The inner vias 300 and the outer vias 310 serve to electrically interconnect the radial blades 200 of the bottom wire layer 110 with the radial blades 400 of the top wire layer 140. The magnetic nanocomposite film layer 120 further includes an input lead via 320 to electrically interconnect the input lead tab 210 to the input lead 410. As illustrated in FIG. 3, the magnetic nanocomposite film layer 120 includes a central portion 330 extending from the center of the micro-inductor 100 to the inner vias 300, an enclosed portion 340 extending from the inner vias 300 to the outer vias 310, and an outer portion 350 extending out from the outer vias 310. Note that one may vary the permeability of the magnetic nanocomposite film layer 120 as a function of position to generate a more uniform magnetic flux, and thereby improve performance of the toroid micro-inductor 100.

Figure 5:
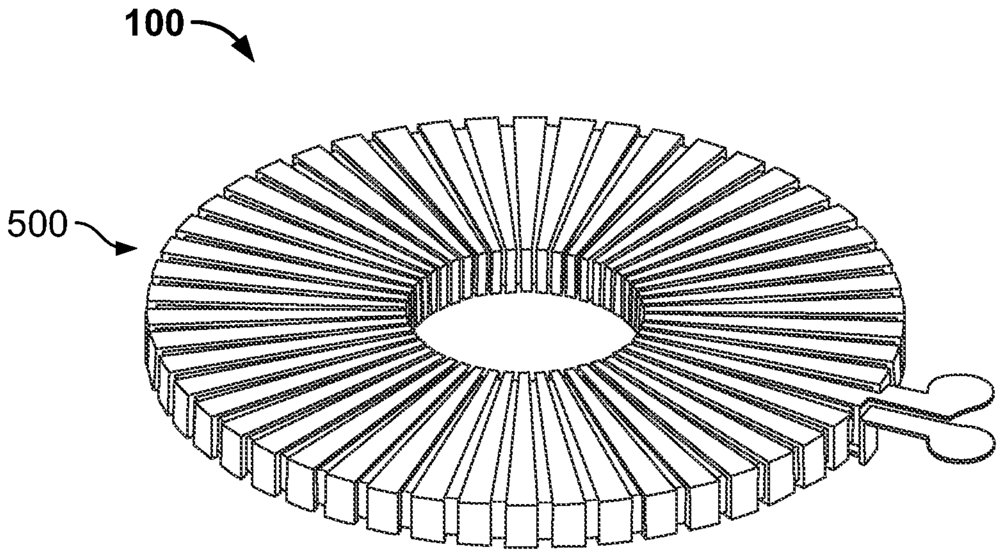
FIG. 5 illustrates a three-dimensional (3D) view of a toroid micro-inductor in accordance with one or more embodiments of the present invention.

FIG. 5 illustrates a three-dimensional (3D) view of the micro-inductor 100, including that the radial blades 200 of the bottom wire layer 110 and the radial blades 400 of the top wire layer 140 are electrically interconnected by the inner vias 300 and the outer vias 310 of the plurality of vias 130, and thereby in combination form a single continuous coil 500. As illustrated in FIG. 5, the enclosed portion 340 of the magnetic nanocomposite film layer 120, is enclosed by the single continuous coil 500. Note that both the central portion 330 and the outer portion 350 of the magnetic nanocomposite film layer 120 would be located outside of the single continuous coil 500 (and thus are not illustrated in FIG. 5 for clarity), thereby forming an external portion of the magnetic nanocomposite film layer 120.

While the micro-inductor 100 illustrated in FIGS. 1-5 includes both the input lead 410 and the output lead 420 as part of the top wire layer 140, this need not be the case. For example, in other embodiments, the input lead is included as part of the bottom wire layer while the output lead is included as part of the top wire layer.

The bottom wire layer 110 may be formed of any suitable electrically conductive material. Exemplary materials that may be used to form the bottom wire layer 110 in various embodiments include metals, such as gold, silver, copper, or aluminum.

The bottom wire layer 110 may have any suitable thickness. Exemplary thicknesses of the bottom wire layer 110 may be in the range of approximately 0.5 μm to approximately 1.0 mm.

The bottom wire layer 110 may be formed by any suitable process. One exemplary process includes the use of photolithography to create a series of openings in a photoresist layer that correspond to the radial blades 200 and the input lead tab 210 of the bottom wire layer 110. A layer of metal, for example gold, silver, copper, or aluminum is deposited over the photoresist layer. The photoresist layer is then dissolved, thereby "lifting off" the overlying metal layer, leaving only the desired radial blades 200 and the input lead tab 210. In an alternative photolithography process, a layer of metal, for example gold, silver, copper, or aluminum is deposited. A layer of photoresist is then deposited over the metal layer and patterned to form the radial blades 200 and the input lead tab 210 of the bottom wire layer 110. An etch is used to remove the excess portion of the metal layer, and then the remaining photoresist is dissolved, leaving behind the desired radial blades 200 and the input lead tab 210. In yet another exemplary process, the radial blades 200 and the input lead tab 210 of the bottom wire layer 110 are directly written using an additive manufacturing technique.

The magnetic nanocomposite film layer 120 may be formed of any suitable material. Exemplary materials that may be used to form the magnetic nanocomposite film layer 120 in various embodiments include Fe, Co, Ni, FeN, CoFe, CoNiFe, oxide-coated ferromagnetic nanoparticles, and/or nitride-coated ferromagnetic nanoparticles.

The magnetic nanocomposite film layer 120 may have any suitable thickness. Exemplary thicknesses of the magnetic nanocomposite film layer 120 may be in the range of approximately 1.0 μm to approximately 1.0 mm.

The magnetic nanocomposite film layer 120 may be formed by any suitable process. Exemplary processes include in-situ or ex-situ liquid-to-solid molding and 3-D printing processes. In preferred embodiments, the material used to form the magnetic nanocomposite film layer 120 has near-zero conductivity, i.e., a conductivity of less than approximately 1.0 E-9 S/m (1.0 nS/m). Because the material used to form the magnetic nanocomposite film layer 120 has near-zero conductivity, the inner vias 300 and the outer vias 310 of the plurality of vias 130, and the input lead via 320, are self-insulating due to the magnetic nanocomposite film layer 120.

The holes (or apertures) used to create the inner vias 300, the outer vias 310, and the input lead via 320 may be formed by any suitable process. One exemplary process includes laser drilling of the holes through the magnetic nanocomposite film layer 120 down to the underlying radial blades 200 and the input lead tab 210 of the bottom wire layer 110. In an exemplary photolithography process, a layer of photoresist is deposited over the magnetic nanocomposite film layer 120 and patterned to form the holes used to create the inner vias 300, the outer vias 310, and the input lead via 320. An etch is used to remove the portion of the magnetic nanocomposite film layer 120 exposed by the holes in the photoresist layer, and then the remaining photoresist is dissolved, leaving behind the desired holes used to create the inner vias 300, the outer vias 310, and the input lead via 320. The holes may have any suitable cross-section. For example, the holes may have a circular cross-section, a rectangular cross-section, or may form a portion of an arc. The holes may have any suitable size. For example, the holes may have a circular cross-section with a diameter in the range of approximately 1.0 μm to approximately 1.0 mm or a rectangular cross-section with a side length in the range of approximately 1.0 μm to approximately 1.0 mm. Spacing between adjacent holes may have a center-to-center spacing in the range of approximately 50 μm to approximately 2.0 mm.

The inner vias 300, the outer vias 310, and the input lead via 320 may be formed of any suitable electrically conductive material. Exemplary materials that may be used to form the inner vias 300, the outer vias 310, and the input lead via 320 in various embodiments include metals, such as gold, silver, copper, or aluminum.

The inner vias 300, the outer vias 310, and the input lead via 320 may be formed by any suitable process. One exemplary process includes electroplating, in which the portion of the radial blades 200 and the input lead tab 210 of the bottom wire layer 110 exposed by the previously created holes serve as the seed layer for an electrodeposition process. The inner vias 300, the outer vias 310, and the input lead via 320 are electroplated to a thickness of at least the thickness of the magnetic nanocomposite film layer 120. The surface of the magnetic nanocomposite film layer 120, the inner vias 300, the outer vias 310, and the input lead via 320 may be planarized as needed, using, for example, chemical mechanical polishing (CMP). Another exemplary process includes the Damascene process, in which a conformal layer of the desired metal is deposited on the surface of the magnetic nanocomposite film layer 120, thereby completely filling the previously created holes. The surface is then planarized, for example, using a CMP process, such that the surface of the magnetic nanocomposite film layer 120 is again exposed.

The top wire layer 140 may be formed of any suitable electrically conductive material. Exemplary materials that may be used to form the top wire layer 140 in various embodiments include metals, such as gold, silver, copper, or aluminum.

The top wire layer 140 may have any suitable thickness. Exemplary thicknesses of the top wire layer 140 may be in the range of approximately 0.5 μm to approximately 1.0 mm.

The top wire layer 140 may be formed by any suitable process. One exemplary process includes the use of photolithography to create a series of openings in a photoresist layer that correspond to the radial blades 400, the input lead 410, and the output lead 420 of the top wire layer 140. A layer of metal, for example gold, silver, copper, or aluminum is deposited over the photoresist layer. The photoresist layer is then dissolved, thereby "lifting off" the overlying metal layer, leaving only the desired radial blades 400, the input lead 410, and the output lead 420. In an alternative photolithography process, a layer of metal, for example gold, silver, copper, or aluminum is deposited. A layer of photoresist is then deposited over the metal layer and patterned to form the radial blades 400, the input lead 410, and the output lead 420. An etch is used to remove the excess portion of the metal layer, and then the remaining photoresist is dissolved, leaving behind the desired radial blades 400, the input lead 410, and the output lead 420. In yet another exemplary process, the radial blades 400, the input lead 410, and the output lead 420 of the top wire layer 140 are directly written using an additive manufacturing technique.

In other embodiments, the micro-inductor 100 may further include a first encapsulating magnetic nanocomposite film layer (not illustrated) and a second encapsulating magnetic nanocomposite film layer (not illustrated). The first encapsulating magnetic nanocomposite film layer would be located on the bottom surface of the bottom wire layer 110 and the bottom surface of the magnetic nanocomposite film layer 120. The second encapsulating magnetic nanocomposite film layer would be located on the top surface of the magnetic nanocomposite film layer 120 and the top surface of the top wire layer 140. The first encapsulating magnetic nanocomposite film layer and the second encapsulating magnetic nanocomposite film layer serve to guide and define the magnetic field external to the single continuous coil 500 by fully encapsulating the single continuous coil 500.

Figure 6:
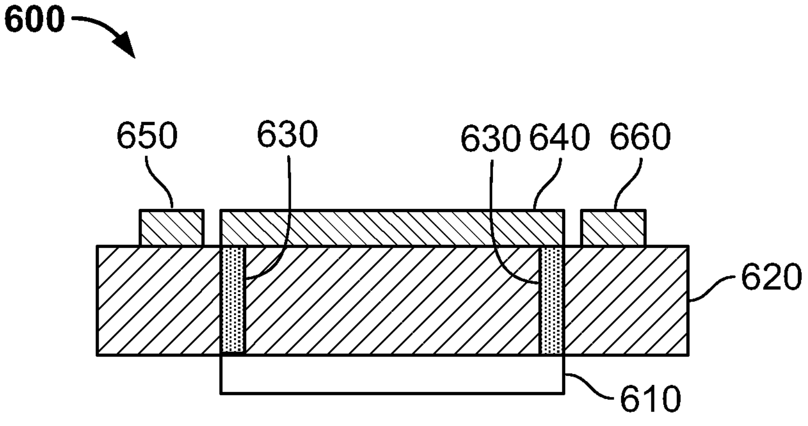
FIG. 6 illustrates a cross-sectional view of a solenoid micro-inductor in accordance with one or more embodiments of the present invention.

FIG. 6 illustrates a cross-sectional view of a solenoid (or linear) micro-inductor 600 in accordance with one or more embodiments. The solenoid micro-inductor 600 includes a bottom wire layer 610 with a plurality of blades (not individually illustrated), a magnetic nanocomposite film layer 620 with a plurality of vias 630 therein, and a top wire layer 640 that includes a plurality of blades (not individually illustrated), an input lead 650, and an output lead 660. As the solenoid micro-inductor 600 includes many of the same elements as the micro-inductor 100 illustrated in FIGS. 1-5, further description will be omitted.

Fabrication Processes

Figure 7:
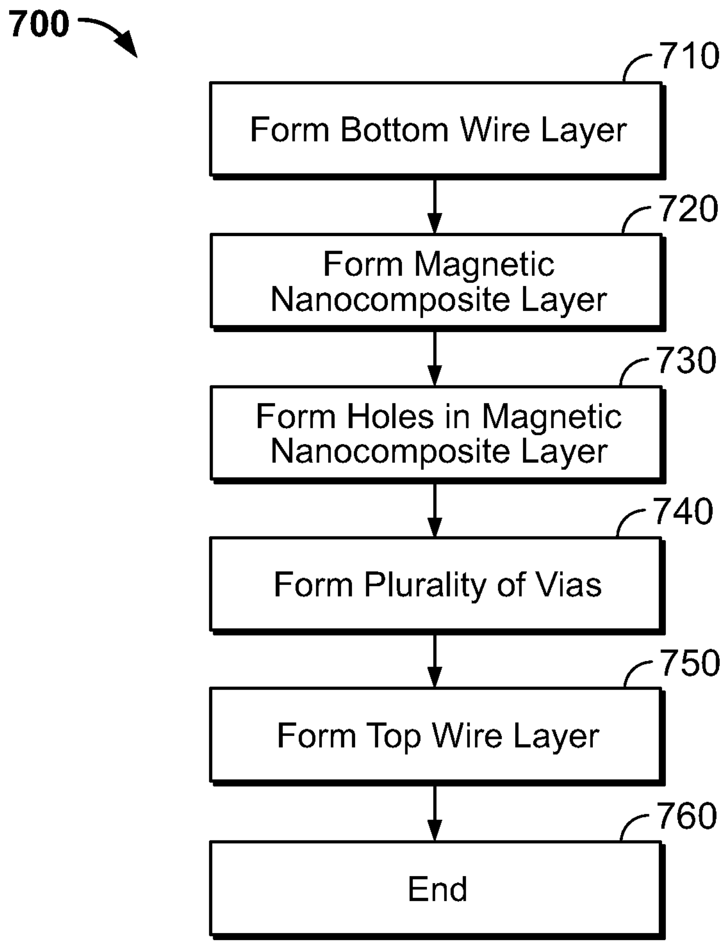
FIG. 7 illustrates a flowchart of a method in accordance with one or more embodiments of the present invention to fabricate a magnetic micro-device.

FIG. 7 illustrates a flowchart of a method 700 in accordance with at least one embodiment to fabricate a magnetic micro-device, for example, a micro-inductor. In step 710, the bottom wire layer, including the bottom radial blades, the input lead, and the output lead, is formed. In step 720, the magnetic nanocomposite film layer is formed. In step 730, the holes that will be filled to form the inner vias and the outer vias of the plurality of vias are formed. In step 740, the plurality of vias is formed by filling the holes formed in step 730. In step 750, the top wire layer, including the top radial blades, is formed. The process is complete in step 760.

As will be appreciated by those of ordinary skill in the art, the order of the above steps may be altered, various steps may be combined, and one or more steps may be added or deleted depending upon the specific embodiment. As will also be appreciated by those of ordinary skill in the art, the method 700 illustrated in FIG. 7 generally corresponds to that required to fabricate the toroid micro-inductor 100 illustrated in FIGS. 1-5. The method 700 illustrated in FIG. 7 can readily be altered to fabricate the solenoid micro-inductor 600 illustrated in FIG. 6 or various other magnetic micro-devices in accordance with various embodiments.

Device Applications

While a toroid micro-inductor 100 and a solenoid micro-inductor 600 were described above, additional embodiments include other magnetic micro-devices. Example magnetic micro-devices in accordance with these additional embodiments may include, for example, transformers, generators, motors, electromagnetic switches, and voice coils (for speakers or microphones).

Figure 8:
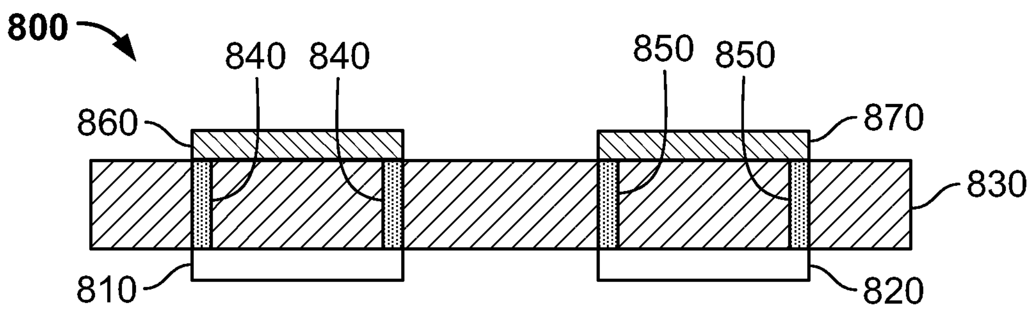
FIG. 8 illustrates a cross-sectional view of a toroid micro-transformer in accordance with one or more embodiments of the present invention.

FIG. 8 illustrates a cross-sectional view of a toroid micro-transformer 800 in accordance with one or more embodiments. The toroid micro-transformer 800 includes a first bottom wire layer 810 and a second bottom wire layer 820, with the first bottom wire layer 810 corresponding to a portion of a primary coil, while the second bottom wire layer 820 corresponds to a portion of a secondary coil. The toroid micro-transformer 800 includes a magnetic nanocomposite film layer 830, a first plurality of vias 840, and a second plurality of vias 850, with the first plurality of vias 840 and the second plurality of vias 850 corresponding to portions of the primary and secondary coils, respectively. The toroid micro-transformer 800 further includes a first top wire layer 860 and a second top wire layer 870, with the first top wire layer 860 and second top wire layer 870 corresponding to portions of the primary and secondary coils, respectively.

Figure 9:
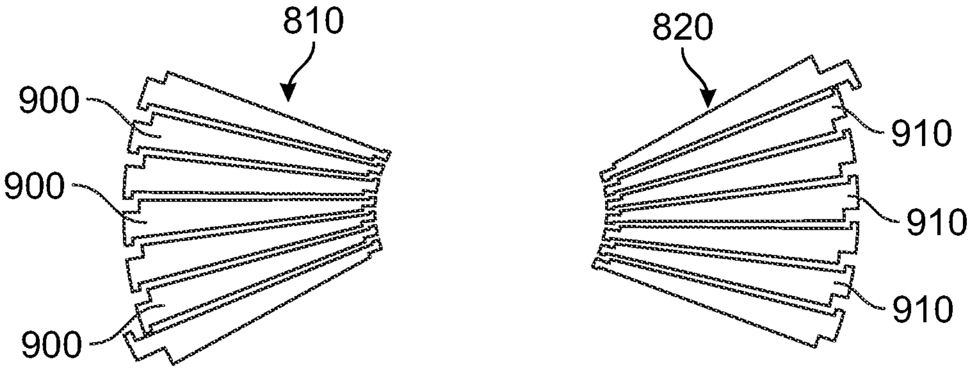
FIGS. 9-11 illustrate plan views of various layers of a toroid micro-transformer in accordance with one or more embodiments of the present invention.
Figure 10:
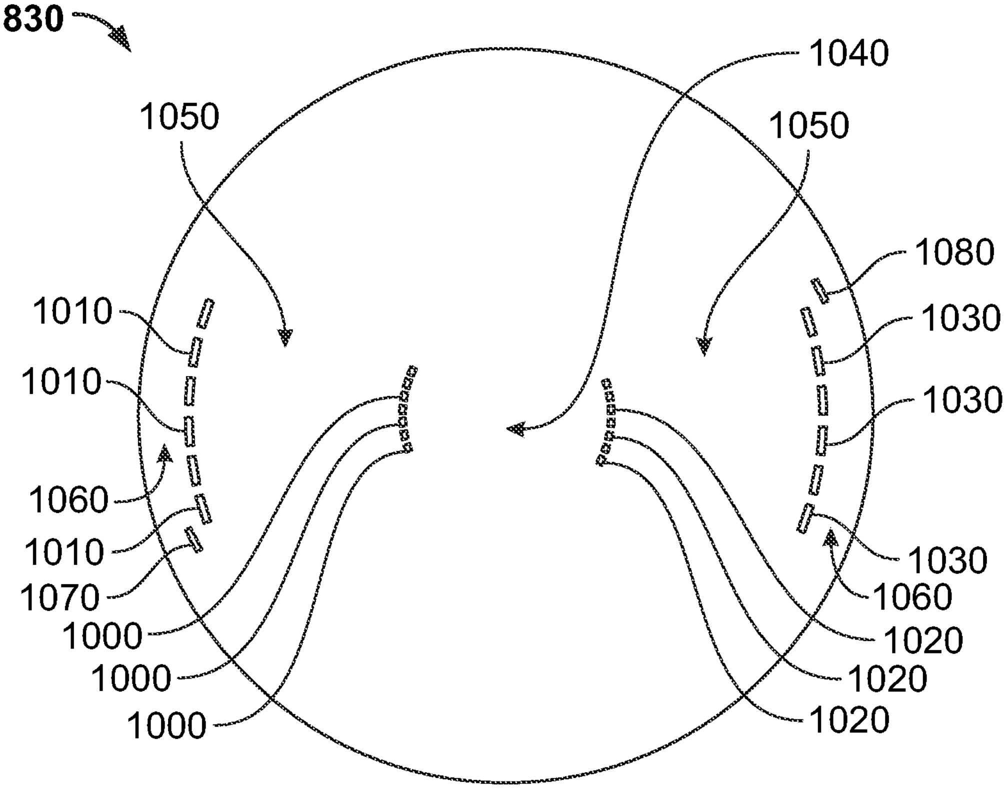
Figure 11:
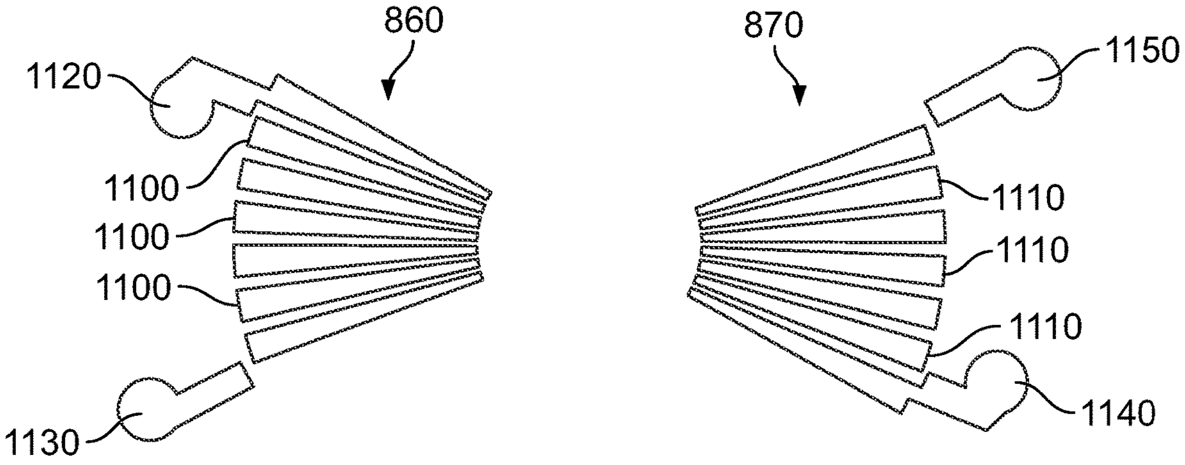

FIGS. 9-11 illustrate plan views of the first bottom wire layer 810 and the second bottom wire layer 820; the magnetic nanocomposite film layer 830, the first plurality of vias 840, and the second plurality of vias 850; and the first top wire layer 860 and the second top wire layer 870, respectively. As illustrated in FIG. 9, the first bottom wire layer 810 and the second bottom wire layer 820 are composed of a first plurality of generally radial blades 900 and a second plurality of generally radial blades 910, respectively. As illustrated in FIG. 11, the first top wire layer 860 and the second top wire layer 870 are composed of a first plurality of generally radial blades 1100 and a second plurality of generally radial blades 1110, respectively. The first top wire layer 860 also includes a first input lead 1120 and a first output lead 1130. The first input lead 1120 is electrically interconnected with one of the first plurality of generally radial blades 1100. The first output lead 1130 is electrically interconnected with one of the first plurality of generally radial blades 900 through a first output lead via 1070. The second top wire layer 870 also includes a second input lead 1140 and a second output lead 1150. The second input lead 1140 is electrically interconnected with one of the second plurality of generally radial blades 1110. The second output lead 1150 is electrically interconnected with one of the second plurality of generally radial blades 1110 through a second output lead via 1080.

As illustrated in FIG. 10, the magnetic nanocomposite film layer 830 is generally continuous, with the first plurality of vias 840 composed of first inner vias 1000 and first outer vias 1010, while the second plurality of vias 850 is composed of second inner vias 1020, and second outer vias 1030. The first inner vias 1000 and the first outer vias 1010 serve to electrically interconnect the first plurality of generally radial blades 900 of the first bottom wire layer 810 with the first plurality of generally radial blades 1100 of the first top wire layer 860. The second inner vias 1020 and the second outer vias 1030 serve to electrically interconnect the second plurality of generally radial blades 910 of the second bottom wire layer 820 with the second plurality of generally radial blades 1110 of the second top wire layer 870. The magnetic nanocomposite film layer 830 further includes the first output lead via 1070 and the second output lead via 1080.

As also illustrated in FIG. 10, the magnetic nanocomposite film layer 830 includes a central portion 1040 extending from the center of the toroid micro-transformer 800 to the first inner vias 1000 and the second inner vias 1020, an enclosed portion 1050 extending from the first inner vias 1000 and the second inner vias 1020 to the first outer vias 1010 and the second outer vias 1030, and an outer portion 1060 extending out from the first outer vias 1010 and the second outer vias 1030.

Figure 12:
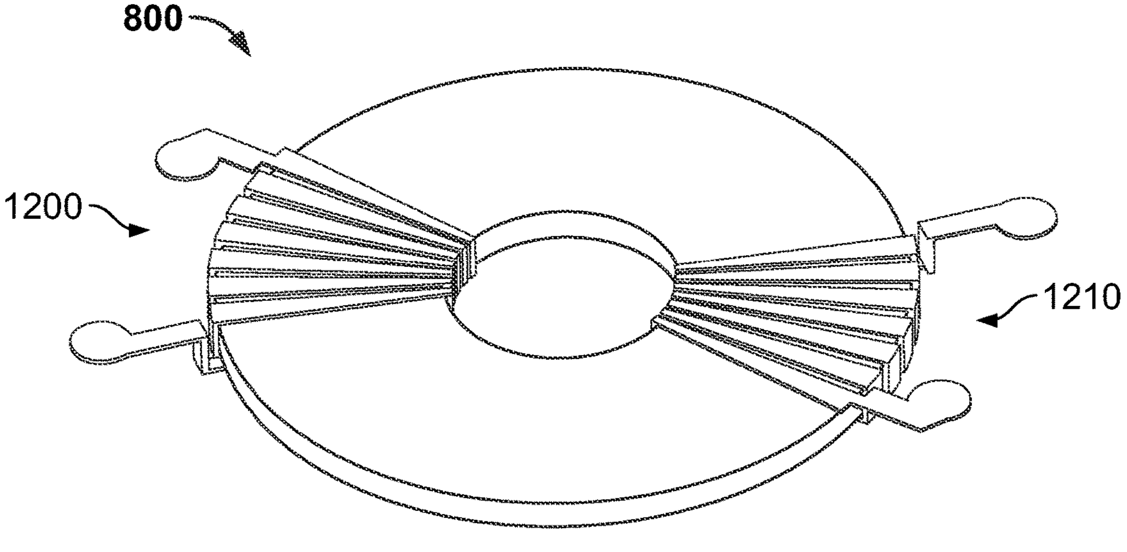
FIG. 12 illustrates a 3D view of a toroid micro-transformer in accordance with one or more embodiments of the present invention.

FIG. 12 illustrates a 3D view of the toroid micro-transformer 800, including that the first plurality of generally radial blades 900 of the first bottom wire layer 810 and the first plurality of generally radial blades 1100 of the first top wire layer 860 are electrically interconnected by the first inner vias 1000 and the first outer vias 1010 of the first plurality of vias 840, and thereby in combination form a first continuous coil 1200, corresponding, for example, to the primary coil of the toroid micro-transformer 800. FIG. 12 also illustrates that the second plurality of generally radial blades 910 of the second bottom wire layer 820 and the second plurality of generally radial blades 1110 of the second top wire layer 870 are electrically interconnected by the second inner vias 1020 and the second outer vias 1030 of the second plurality of vias 850, and thereby in combination form a second continuous coil 1210, corresponding, for example, to the secondary coil of the toroid micro-transformer 800. As illustrated in FIG. 12, the enclosed portion 1050 of the magnetic nanocomposite film layer 830, is enclosed by the first continuous coil 1200 and the second continuous coil 1210. Note that both the central portion 1040 and the outer portion 1060 of the magnetic nanocomposite film layer 830 are located outside of the first continuous coil 1200 and the second continuous coil 1210 (and thus are not illustrated in FIG. 12 for clarity), thereby forming an external portion of the magnetic nanocomposite film layer 830.

The toroid micro-transformer 800 illustrated in FIGS. 8-12 has the same number of turns in the first continuous coil 1200 and the second continuous coil 1210, i.e., a turns ratio of 1:1, thereby implementing an isolation transformer function. In other embodiments, the first continuous coil 1200 and the second continuous coil 1210 may have different numbers of turns. For example, a step-up micro-transformer function may be implemented when the turns ratio is 1:N with N greater than 1. Alternatively, a step-down micro-transformer function may be implemented when the turns ration is 1:N with N less than 1. These same isolation, step-up, and step-down transformer functions may likewise be implemented with the transformers illustrated in FIGS. 13 and 14.

While FIGS. 8-12 illustrate the toroid micro-transformer 800 with the first continuous coil 1200 separate from the second continuous coil 1210, other configurations are possible. For example, the first continuous coil and the second continuous coil are interdigitated in other embodiments. When the first continuous coil and the second continuous coil are interdigitated, it may be preferable to include the first input lead and the first output lead as part of the first bottom wire layer, while the second input lead and the second output lead may preferably be included as part of the second top wire layer.

Figure 13:
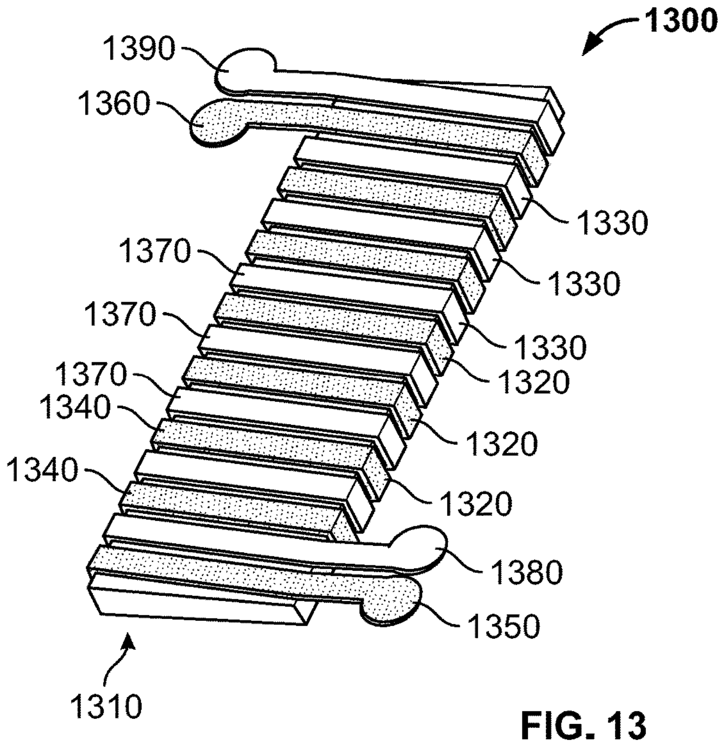
FIG. 13 illustrates a 3D view of a solenoid micro-transformer in accordance with one or more embodiments of the present invention.

FIG. 13 illustrates a 3D view of a solenoid micro-transformer 1300 in accordance with one or more embodiments. The solenoid micro-transformer 1300 includes a first bottom wire layer with first blades (not illustrated) and a second bottom wire layer with second blades (not illustrated). The solenoid micro-transformer 1300 also includes an enclosed magnetic nanocomposite film layer 1310 with a first plurality of vias 1320 and a second plurality of vias 1330 defining the edges of the enclosed magnetic nanocomposite film layer 1310. The solenoid micro-transformer 1300 includes a first top wire layer with first blades 1340, a first input lead 1350, and a first output lead 1360. The solenoid micro-transformer 1300 further includes a second top wire layer with second blades 1370, a second input lead 1380, and a second output lead 1390.

The first blades (not illustrated), the first plurality of vias 1320, and the first blades 1340 form a first continuous coil, while the second blades (not illustrated), the second plurality of vias 1330, and the second blades 1370 form a second continuous coil. Further, the first blades (not illustrated) and the second blades (not illustrated) are interdigitated, while the first blades 1340 and the second blades 1370 are likewise interdigitated. For this reason, the first continuous coil is interdigitated with the second continuous coil and the magnetic flux from the first continuous coil is nearly perfectly coupled to the second continuous coil. An alternative embodiment related to the toroid micro-transformer 800 illustrated in FIGS. 8-12 would likewise have interdigitated coils on the same side of the magnetic nanocomposite film layer 830, as opposed to the opposite sides as illustrated in FIGS. 8-12.

As the solenoid micro-transformer 1300 includes many of the same elements as the toroid micro-transformer 800 illustrated in FIGS. 8-12, further description will be omitted.

Figure 14:
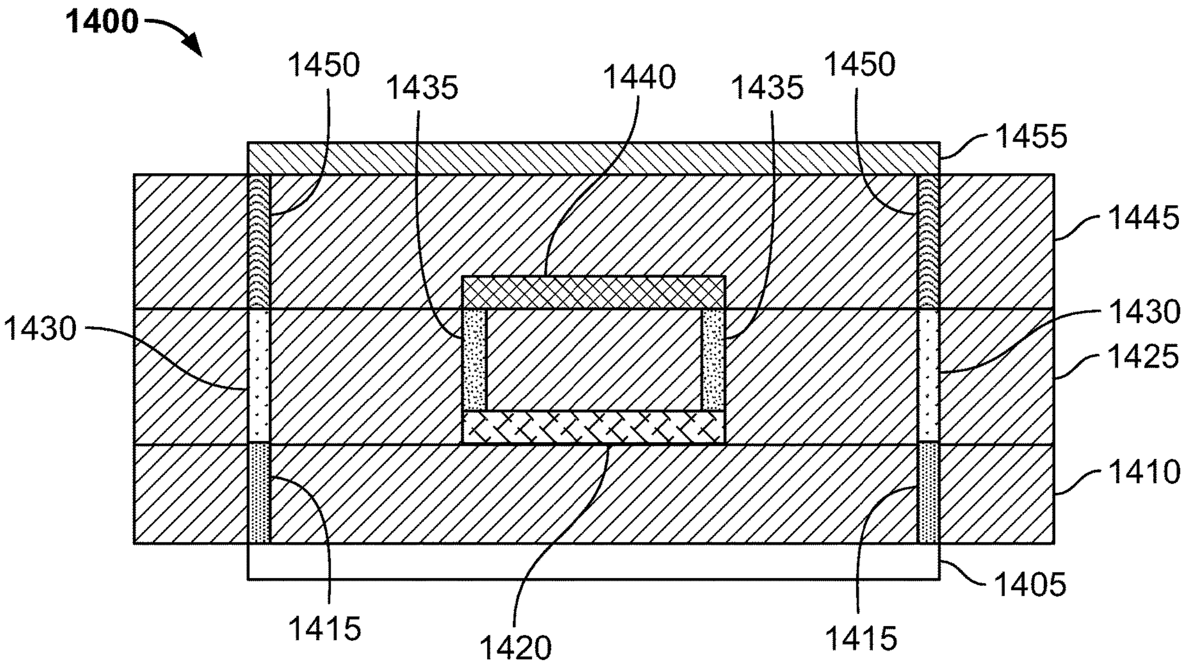
FIG. 14 illustrates a cross-sectional view of a triple-layer micro-transformer in accordance with one or more embodiments of the present invention.

FIG. 14 illustrates a cross-sectional view of a triple-layer micro-transformer 1400 in accordance with one or more embodiments. The triple-layer micro-transformer 1400 includes a first bottom wire layer 1405 corresponding to a portion of a secondary coil. The triple-layer micro-transformer 1400 includes a bottom magnetic nanocomposite film layer 1410 and a first bottom plurality of vias 1415 with the first bottom plurality of vias 1415 corresponding to a portion of the secondary coil. The triple-layer micro-transformer 1400 includes a second lower wire layer 1420 corresponding to a portion of a primary coil. The triple-layer micro-transformer 1400 further includes a middle magnetic nanocomposite film layer 1425, a first middle plurality of vias 1430, and a second middle plurality of vias 1435, with the first middle plurality of vias 1430 and the second middle layer of vias 1435 corresponding to portions of the secondary and primary coils, respectively. The triple-layer micro-transformer 1400 includes a second upper wire layer 1440 corresponding to a portion of a primary coil. The triple-layer micro-transformer 1400 includes a top magnetic nanocomposite film layer 1445 and a first top plurality of vias 1450 with the first top plurality of vias 1450 corresponding to a portion of the secondary coil. Lastly, the triple-layer micro-transformer 1400 includes a first top wire layer 1455 with the first top wire layer 1455 corresponding to a portion of the secondary coil.

The first bottom wire layer 1405 and the first top wire layer 1455 are electrically interconnected by the first bottom plurality of vias 1415, the first middle plurality of vias 1430, and the first top plurality of vias 1450, and thereby in combination form a first continuous coil, corresponding to the secondary coil of the triple-layer micro-transformer 1400. The second lower wire layer 1420 and the second upper wire layer 1440 are electrically interconnected by the second middle plurality of vias 1435, and thereby in combination form a second continuous coil, corresponding to the primary coil of triple-layer micro-transformer 1400. In at least one embodiment, at least a portion of the first continuous coil encircles at least a portion of the second continuous coil. A benefit of the design of the triple-layer micro-transformer 1400 is that the magnetic fields from the primary coil may be more fully concentrated in the secondary coil relative to the designs of the toroid micro-transformer 800.

The triple-layer micro-transformer 1400 illustrated in FIG. 14 corresponds to a solenoid triple-layer micro-transformer. In other embodiments, the triple-layer micro-transformer is a toroid triple-layer micro-transformer.

As will be appreciated by those of ordinary skill in the art, many of the various embodiments related to the toroid micro-transformer 800 illustrated in FIGS. 8-12 may also apply to the solenoid micro-transformer 1300 illustrated in FIG. 13 and the triple-layer micro-transformer 1400 illustrated in FIG. 14. Indeed, many of the various embodiments related to the toroid micro-inductor 100 illustrated in FIGS. 1-5 and the solenoid micro-inductor illustrated in FIG. 6 may also apply to the toroid micro-transformer 800 illustrated in FIGS. 8-12, to the solenoid micro-transformer 1300 illustrated in FIG. 13, and to the triple-layer micro-transformer 1400 illustrated in FIG. 14.

As will also be appreciated by those of ordinary skill in the art, while various coils have been described as primary coils and secondary coils in the micro-transformers, their roles may be reversed. For example, a coil described as a primary coil may serve as the secondary coil, while a corresponding coil described as a secondary coil may serve as a primary coil.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A magnetic micro-device comprising:

a bottom wire layer;

a magnetic nanocomposite film layer on a top surface of the bottom wire layer, the magnetic nanocomposite film layer having near-zero conductivity, the magnetic nanocomposite film layer including a plurality of apertures therethrough;

a plurality of vias within the plurality of apertures; and a top wire layer on a top surface of the magnetic nanocomposite film layer and a top surface of the plurality of vias, the plurality of vias adapted to electrically interconnect the bottom wire layer and the top wire layer;

wherein the bottom wire layer, the plurality of vias, and the top wire layer in combination form at least one continuous coil.

2. The magnetic micro-device of claim 1, wherein the bottom wire layer includes a plurality of bottom blades; and wherein the top wire layer includes a plurality of top blades.

3. The magnetic micro-device of claim 1, wherein each of the bottom wire layer, the plurality of vias, and the top wire layer comprises one or more of gold, silver, copper, and aluminum.

4. The magnetic micro-device of claim 1, wherein each of the bottom wire layer and the top wire layer has a thickness of between approximately 0.5 μm and approximately 1.0 mm.

5. The magnetic micro-device of claim 1, wherein the magnetic nanocomposite film layer comprises one or more of Fe, Co, Ni, FeN, CoFe, CoNiFe, oxide-coated ferromagnetic nanoparticles, or nitride-coated ferromagnetic nanoparticles.

6. The magnetic micro-device of claim 1, wherein the magnetic nanocomposite film layer has a thickness of between approximately 1.0 μm and approximately 1.0 mm.

7. The magnetic micro-device of claim 1, wherein a permeability of the magnetic nanocomposite film layer varies as a function of position.

8. The magnetic micro-device of claim 1, further comprising:

a first encapsulating magnetic nanocomposite film layer on a bottom surface of the bottom wire layer and a bottom surface of the magnetic nanocomposite film layer; and a second encapsulating magnetic nanocomposite film layer on a top surface of the top wire layer and the top surface of the magnetic nanocomposite film layer.

9. The magnetic micro-device of claim 1, wherein the magnetic micro-device is one of a toroid micro-inductor, a solenoid micro-inductor, a toroid micro-transformer, or a solenoid micro-transformer.

10. A micro-transformer comprising:

a first bottom wire layer;

a second bottom wire layer;

a magnetic nanocomposite film layer on the first bottom wire layer and the second bottom wire layer, the magnetic nanocomposite film layer having near-zero conductivity, the magnetic nanocomposite film layer including a plurality of apertures therethrough;

a first plurality of vias within a first portion of the plurality of apertures;

a second plurality of vias within a second portion of the plurality of apertures;

a first top wire layer on the magnetic nanocomposite film layer and the first plurality of vias, the first plurality of vias adapted to electrically interconnect the first bottom wire layer and the first top wire layer; and a second top wire layer on the magnetic nanocomposite film layer and the second plurality of vias, the second plurality of vias adapted to electrically interconnect the second bottom wire layer and the second top wire layer;

wherein the first bottom wire layer, the first plurality of vias, and the first top wire layer in combination form a first continuous coil; and wherein the second bottom wire layer, the second plurality of vias, and the second top wire layer in combination form a second continuous coil.

11. The micro-transformer of claim 10, wherein the first bottom wire layer includes a first plurality of bottom blades;

wherein the first top wire layer includes a first plurality of top blades;

wherein the second bottom wire layer includes a second plurality of bottom blades; and wherein the second top wire layer includes a second plurality of top blades.

12. The micro-transformer of claim 11, wherein the first plurality of bottom blades is interdigitated with the second plurality of bottom blades; and wherein the first plurality of top blades is interdigitated with the second plurality of top blades.

13. The micro-transformer of claim 10, wherein the magnetic nanocomposite film layer comprises one or more of Fe, Co, Ni, FeN, CoFe, CoNiFe, oxide-coated ferromagnetic nanoparticles, or nitride-coated ferromagnetic nanoparticles.

14. The micro-transformer of claim 10, wherein the first continuous coil and the second continuous coil have a turns ratio of 1:N;

wherein when $N<1$, the micro-transformer implements a voltage step-down function;

wherein when $N=1$, the micro-transformer implements an isolation function; and wherein when $N>1$, the micro-transformer implements a voltage step-up function.

15. The micro-transformer of claim 10, wherein the micro-transformer is a toroid micro-transformer or a solenoid micro-transformer.

16. A micro-transformer comprising:

a first bottom wire layer;

a bottom magnetic nanocomposite film layer on the first bottom wire layer, the bottom magnetic nanocomposite film layer having near-zero conductivity, the bottom magnetic nanocomposite film layer including a plurality of bottom apertures therethrough;

a first bottom plurality of vias within the plurality of bottom apertures;

a second lower wire layer on the bottom magnetic nanocomposite film layer and the first bottom plurality of vias;

a middle magnetic nanocomposite film layer on the bottom magnetic nanocomposite film layer, the first bottom plurality of vias, and the second lower wire layer, the middle magnetic nanocomposite film layer having near-zero conductivity, the middle magnetic nanocomposite film layer including a plurality of middle apertures therethrough;

a first middle plurality of vias within a first portion of the plurality of middle apertures;

a second middle plurality of vias within a second portion of the plurality of middle apertures;

a second upper wire layer on the middle magnetic nanocomposite film layer and the second middle plurality of vias;

a top magnetic nanocomposite film layer on the middle magnetic nanocomposite film layer, the first middle plurality of vias, and the second upper wire layer, the top magnetic nanocomposite film layer having near-zero conductivity, the top magnetic nanocomposite film layer including a plurality of top apertures therethrough;

a first top plurality of vias within the plurality of top apertures; and a first top wire layer on the top magnetic nanocomposite film layer and the first top plurality of vias;

wherein the first bottom wire layer, the first bottom plurality of vias, the first middle plurality of vias, the first top plurality of vias, and the first top wire layer are electrically interconnected and in combination form a first continuous coil; and wherein the second lower wire layer, the second middle plurality of vias, and the second upper wire layer are electrically interconnected and in combination form a second continuous coil.

17. The micro-transformer of claim 16, wherein at least a portion of the first continuous coil encircles at least a portion of the second continuous coil.

* * * * *